(12) United States Patent
Bhaskaran et al.

(10) Patent No.: US 7,843,995 B2
(45) Date of Patent: Nov. 30, 2010

(54) TEMPORAL AND SPATIAL ANALYSIS OF A VIDEO MACROBLOCK

(75) Inventors: Vasudev Bhaskaran, Sunnyvale, CA (US); William Chen, Foster City, CA (US)

(73) Assignee: Seiko Epson Corporation, Tokyo (JP)

( * ) Notice: Subject to any disclaimer, the term of this patent is extended or adjusted under 35 U.S.C. 154(b) by 1380 days.

(21) Appl. No.: 11/311,023

(22) Filed: Dec. 19, 2005

(65) Prior Publication Data

US 2007/0140352 A1 Jun. 21, 2007

(51) Int. Cl.
*H04N 11/04* (2006.01)
*H04N 7/12* (2006.01)
(52) U.S. Cl. ............................ 375/240.13; 375/240.16; 375/240.24; 375/240.26; 382/239; 382/244
(58) Field of Classification Search ............ 375/240.02, 375/240.12, 240.13, 240.16, 240.24; 382/239, 382/244
See application file for complete search history.

(56) References Cited

U.S. PATENT DOCUMENTS

| | | | |
|---|---|---|---|
| 6,526,096 B2 | 2/2003 | Lainema et al. | |
| 6,646,578 B1 | 11/2003 | Au | |
| 6,674,911 B1 | 1/2004 | Pearlman et al. | |
| 6,711,212 B1 | 3/2004 | Lin | |
| 6,728,315 B2 | 4/2004 | Haskell et al. | |
| 6,757,330 B1 | 6/2004 | Hsu | |
| 6,763,068 B2 | 7/2004 | Oktem | |
| 6,785,333 B2 | 8/2004 | Yoo | |
| 6,795,584 B2 | 9/2004 | Karczewicz et al. | |
| 6,798,977 B2 | 9/2004 | Maeda | |
| 7,010,044 B2 * | 3/2006 | Dattani et al. .......... | 375/240.24 |
| 7,693,219 B2 * | 4/2010 | Yan ....................... | 375/240.16 |
| 2002/0110194 A1 | 8/2002 | Bottreau | |
| 2003/0058949 A1 | 3/2003 | MacInnis et al. | |
| 2003/0112873 A1 | 6/2003 | Demos | |
| 2003/0202607 A1 | 10/2003 | Srinivasan | |
| 2004/0001546 A1 | 1/2004 | Tourapis et al. | |
| 2004/0013199 A1 | 1/2004 | Winger et al. | |
| 2004/0028131 A1 | 2/2004 | Ye et al. | |
| 2004/0057624 A1 | 3/2004 | Wells | |
| 2004/0062307 A1 | 4/2004 | Hallapuro et al. | |
| 2004/0131121 A1 | 7/2004 | Dumitras et al. | |
| 2004/0170333 A1 | 9/2004 | Toivonen et al. | |

(Continued)

FOREIGN PATENT DOCUMENTS

WO  WO 02/071741  9/2002

(Continued)

OTHER PUBLICATIONS

Sullivan, G., et al., "Video Compression—From Concepts to the H.264/AVC Standard", Proceedings of the *IEEE*, vol. 93, No. 1, Dec. 2004, pp. 18-31.

(Continued)

*Primary Examiner*—Kimberly A Williams

(57) ABSTRACT

The temporal and/or spatial characteristics of a macroblock are analyzed in order to reduce the number of modes for which motion estimation and rate distortion efficiency calculations are to be performed. In one embodiment, macroblock mean and variance characteristics are analyzed to merge sub-blocks together within the macroblock. These merged sub-blocks may be used to identify both inter and intra modes for the macroblock.

13 Claims, 11 Drawing Sheets

U.S. PATENT DOCUMENTS

| | | |
|---|---|---|
| 2004/0170395 A1 | 9/2004 | Filippini et al. |
| 2004/0190616 A1 | 9/2004 | Linzer et al. |
| 2004/0233993 A1 | 11/2004 | Johansen et al. |
| 2004/0240549 A1 | 12/2004 | Cote et al. |
| 2004/0252760 A1 | 12/2004 | Winger |
| 2004/0252768 A1 | 12/2004 | Suzuki et al. |
| 2004/0252901 A1 | 12/2004 | Klein Gunnewiek et al. |
| 2005/0013376 A1* | 1/2005 | Dattani et al. .......... 375/240.24 |
| 2005/0025236 A1 | 2/2005 | Yan et al. |
| 2005/0025249 A1 | 2/2005 | Zhao et al. |
| 2006/0062302 A1* | 3/2006 | Yin et al. ............... 375/240.16 |
| 2006/0193386 A1* | 8/2006 | Lin et al. ............... 375/240.16 |
| 2006/0274833 A1* | 12/2006 | Kojokaro et al. ....... 375/240.16 |
| 2007/0047648 A1* | 3/2007 | Tourapis et al. ........ 375/240.13 |
| 2007/0140344 A1* | 6/2007 | Shima .................... 375/240.16 |
| 2008/0002770 A1* | 1/2008 | Ugur et al. ............. 375/240.16 |
| 2008/0117976 A1* | 5/2008 | Lu et al. ................. 375/240.16 |
| 2008/0232463 A1* | 9/2008 | Lu et al. ................. 375/240.02 |
| 2008/0279465 A1* | 11/2008 | Raveendran et al. ........ 382/244 |
| 2008/0310502 A1* | 12/2008 | Kim et al. .............. 375/240.02 |
| 2009/0016443 A1* | 1/2009 | Kim et al. .............. 375/240.24 |
| 2009/0052534 A1* | 2/2009 | Wang et al. ............ 375/240.13 |
| 2009/0067495 A1* | 3/2009 | Au et al. ................ 375/240.12 |
| 2009/0110066 A1* | 4/2009 | Wang et al. ............ 375/240.12 |
| 2009/0195690 A1* | 8/2009 | Wang ...................... 348/409.1 |
| 2010/0118959 A1* | 5/2010 | Lou et al. .............. 375/240.16 |

FOREIGN PATENT DOCUMENTS

| | | |
|---|---|---|
| WO | WO 2004/080084 | 9/2004 |

OTHER PUBLICATIONS

He, Zhihai, et al., "A Unified Rate-Distortion Analysis Framework for Transform Coding", *IEEE* Transactions on Circuits and Systems for Video Technology, vol. 11, No. 12, Dec. 2001, pp. 1221-1236.

Hyungjoon Kim, et al., "Low-Complexity Macroblock Mode Selection for H.264/AVC Encoders", *IEEE* International Conference on Image Processing, Oct. 2004.

"Efficient Intra-Prediction Algorithm in H.264", B. Meng, et al., 2003, pp. 837-840.

"H.264 and MPEG-4, Video Compression, Video Coding for Next-generation Multimedia", Iain E.G. Richardson, 2003, pp. 170-185.

"Sobol Partial Distortion Algorithm for Fast Full Search in Block Motion Estimation", D. Quaglia, et al., Proceedings of EuroGraphics Multimedia Workshop 2001, Manchester, United Kingdom, Sep. 2001, pp. 87-94.

Chen, et al., "Efficient Block Size Selection for MPEG-2 to H.264 Transcoding", pp. 300-303, 2004.

* cited by examiner

FIGURE 11

|      | $L_1$ | $L_2$ | $L_3$ | $L_4$ |
|------|-------|-------|-------|-------|
| $T_1$ | 1120 | 1124 | 1125 | 1126 |
| $T_2$ | 1121 |      |      |      |
| $T_3$ | 1122 |      |      |      |
| $T_4$ | 1123 |      |      |      |

1100
1130
1140

TEMPORAL AND SPATIAL ANALYSIS OF A VIDEO MACROBLOCK

REFERENCE TO RELATED APPLICATIONS

This application is related to U.S. patent application entitled "Prediction Mode Selection in an Encoder," Ser. No. 11/041,141, filed on Jan. 21, 2005; U.S. Patent application entitled "Motion Estimation and Inter Mode Prediction," Ser. No. 11/158,548, filed on Jun. 21, 2005; and U.S. patent application entitled "Macroblock Homogeneity Analysis and Inter Mode Prediction," Ser. No. 11/305,927, filed on Dec. 19, 2005, all of which are incorporated by reference in their entirety.

BACKGROUND

A. Technical Field

The present invention relates generally to the encoding of data for transmission along a communications link, and more particularly, to temporal and spatial analysis of a video macroblock prior to encoding.

B. Background of the Invention

The burden of high bandwidth applications, such as voice and video, on networks is continually increasing. To facilitate these bandwidth intensive applications, compression technology and standards are evolving to allow these applications to be more effectively communicated across a network to a client. One such standard that relates to the encoding and decoding of video signals is MPEG-4's latest coding standard referred to as MPEG-4/AVC (Advanced Video Coding Standard), which is also commonly referred to by its International Telecommunications Union standard name of H.264. For higher coding efficiencies, MPEG-4/AVC provides tools for variable block size motion compensation prediction for encoding video macroblocks.

Although this standard generally improves the method in which data is encoded, it may also place a significant strain on the processing resources of the encoder itself. Because of the time-sensitive nature of transmitting and receiving video data, an encoder has a limited amount of time to select an appropriate encoding method for a video frame, encode the video frame, and transmit the frame onto a network. The quality of the video signal may be jeopardized if the encoder is unable to complete all of the necessary encoding computations, within the requisite time, that may be needed to encode and transmit the video signal.

FIG. 1 illustrates a typical communications link 120 on which an encoded video signal may be communicated. As illustrated, a video camera 110 generates a video signal, which is sent to an encoder 115. This encoder 115 may be software located on a computer or server that is connected to the communications link 120. The encoder 115 receives a video frame, which is typically divided in macroblocks for encoding purposes. Depending on the content in these macroblocks, they may be further partitioned into smaller blocks to allow more precision in the encoding process.

Each of these macroblocks, and sub-blocks within a macroblock, may be encoded relative to another block located within the same video frame or relative to a block in a previous or future reference frame within the video signal. This encoding is intended to reduce the amount of data redundancy that is transmitted on the communications link 120.

There are typically two types of modes, intra and inter mode, in which a macroblock may be encoded. Intra mode encoding means that encoding occurs relative to blocks within the same video frame. Inter mode encoding means that encoding occurs relative to one or more reference frames outside the current video frame. After a macroblock is encoded, it is transmitted, via the communications link 120, to a receive-side decoder 125. The decoder 125 reconstructs the macroblock within the video signal so that it may be shown on the display device 130.

As mentioned above, when inter mode encoding is performed, a macroblock (e.g., a 16×16 block within a video frame) is encoded relative to a macroblock in another reference frame. The encoder may select from a number of different modes to encode a particular macroblock.

The processing and time requirements for the analysis and eventual selection of an appropriate encoding mode may place significant strain on an encoder. Current standards, such as H.264, in which variable-block size motion compensation prediction are performed may further complicate the process of selecting an appropriate encoding mode.

SUMMARY OF THE INVENTION

The present invention potentially reduces the processing requirements in selecting an inter mode for encoding a video macroblock. In one embodiment of the invention, macroblock spatial and temporal variances are analyzed in order to initially reduce the number of modes for which further analysis, including motion estimation, will be performed to select a single mode.

Spatial variance may be analyzed using various techniques and methods including performing a rate distortion ("RD") cost for a macroblock SKIP mode that quantifies the amount of spatial distortion within the macroblock relative to a (0,0) motion vector. This spatial distortion may be indicative of the complexity required to encode the macroblock. Thus, based on the level of spatial distortion, certain modes may be filtered and not analyzed during the selection of an appropriate inter mode.

Temporal variance may be analyzed using various techniques and methods including analyzing inter modes for adjacent (including contiguous) macroblocks in previous frames. This temporal distortion may be indicative of certain inter modes that should be analyzed because modes generally do not drastically change between collocated macroblocks. Accordingly, an analysis of selected inter modes used on adjacent blocks within a previous frame, is likely indicative of a subset of inter modes that should be analyzed.

In one embodiment of the invention, the spatial and temporal variance analyses are compared in order to reduce the number of inter modes for which motion estimation and RD efficiency calculations are performed. For example, if both analyses indicate that a certain inter mode subset should be analyzed then the inter modes outside of the subset are no longer considered. However, if the analyses disagree on an inter mode subset, then a more complete inter mode analysis is performed. An inter mode subset may contain any grouping of inter modes. Furthermore, one skilled in the art will recognize that macroblock temporal and spatial attributes may be associated with various different mode subsets using different techniques and methods.

In yet another embodiment of the invention, a frame preprocessor is used to analyze sub-block mean and variance values within a macroblock as well as relative to other blocks contiguous to the macroblock. This analysis may reduce the number of intra and inter modes that are analyzed prior to the selection of a single mode for encoding.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 11 is an illustration showing a macroblock, including edge 4×4 sub-blocks, and top and left blocks contiguous to the macroblock according to one embodiment of the invention.

DETAILED DESCRIPTION OF THE PREFERRED EMBODIMENTS

Figure 1:
FIG. 1 is an illustration of a communication link on which data may be encoded and decoded.

A system, apparatus and method for reducing the number of inter modes for which motion estimation is performed and selecting an inter mode for encoding a video macroblock is described. In one embodiment of the present invention, the spatial and/or temporal distortion of a macroblock is analyzed prior to analysis of encoding modes. The spatial distortion represents the homogeneity of the macroblock and relates to the amount of distortion between the macroblock and a reference block with a (0,0) motion vector. The temporal distortion represents the continuity of the macroblock relative to its adjacent blocks, and in particular, relates to the amount of temporal variance between the macroblock and its adjacent blocks. Based on these two analyses, the complexity of encoding the macroblock may be inferred and a subset of inter modes defined for which subsequent motion estimation is performed. From this subset, an inter mode may be selected and eventually used to encode the macroblock.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different devices including personal computers and network servers. The embodiments of the present invention may also be present in software, hardware or firmware. Structures and devices shown below in block diagram are illustrative of exemplary embodiments of the invention and are meant to avoid obscuring the invention. Furthermore, connections between components and/or modules within the figures are not intended to be limited to direct connections. Rather, data between these components and modules may be modified, re-formatted or otherwise changed by intermediary components and modules.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview

The present invention may reduce the number of inter modes from which a single inter mode is identified and used for encoding a macroblock. In one embodiment of the invention, an analysis of macroblock spatial and/or temporal characteristics is performed. Based on this analysis, a subset of inter modes is identified. Motion estimation and RD efficiency calculations are performed on the subset in order to identify a single inter mode that may be used to encode the macroblock.

The selection of a particular inter mode may significantly depend on the modes' RD efficiencies. Depending on the mode that is selected, the macroblock may be partitioned into various sub-blocks. Typically, the complexity and required number of computations for an encoding process increases relative to the number of sub-blocks in which the macroblock is divided. Thus, as a macroblock is partitioned into more sub-blocks, the complexity of the mode in which the macroblock is encoded increases and is more able to effectively compensate for larger amounts of distortion.

As mentioned above, one factor that may be used in selecting an appropriate mode is a RD cost computed for each mode. An analysis of each mode's RD cost allows for the selection of an appropriate prediction mode for a particular block. However, these rate distortion computations may be processor intensive and place a burden on the encoder to timely encode the video signal. The rate distortion cost function J is defined as:

$$J(s,c,m|QP,\lambda_m)=SSD(s,c,m|QP)+\lambda_m*R(s,c,m|QP),$$

where QP is the macroblock quantization parameter, $\lambda_m$ is the Lagrange multiplier for mode decisions, SSD is the sum of the squared differences between the original block and a reconstructed block, s is the original block, c is the reconstructed block, m is the mode, and R represents the number of bits associated with the mode.

The complexity of the rate distortion computation, and the number of times the computation is performed, directly affects the time and resources required to identify a prediction mode for a macroblock. Depending on the encoder, and the system in which the encoder operates, these computations may overload the encoder resulting in a degradation of the encoding system performance.

The present invention may reduce the total number of computations performed during the selection of an inter mode by reducing the potential inter modes to a subset of inter modes based on macroblock spatial and temporal characteristics. In one embodiment, the analysis of spatial characteristics is done by analyzing the macroblock homogeneity. In another embodiment, the analysis of temporal characteristics is done by analyzing the variance of modes around the macroblock in adjacent blocks in a previous frame or frames. If the analyses of temporal and/or spatial characteristics suggest that encoding the macroblock may likely be complex, then an appropriate subset of inter modes is identified. Comparatively, if the analyses suggest that encoding the macroblock may be relatively simple, then a different subset of inter modes is identified.

Motion estimation is performed on the inter mode subset to identify corresponding reference blocks and motion vectors for each of these inter modes. Thereafter, RD efficiencies for each of the modes are calculated, such as by performing an RD cost calculation for each of the modes within the subset. Based on the inter mode RD efficiencies, a preferred inter mode is selected.

B. Encoder

Figure 2:
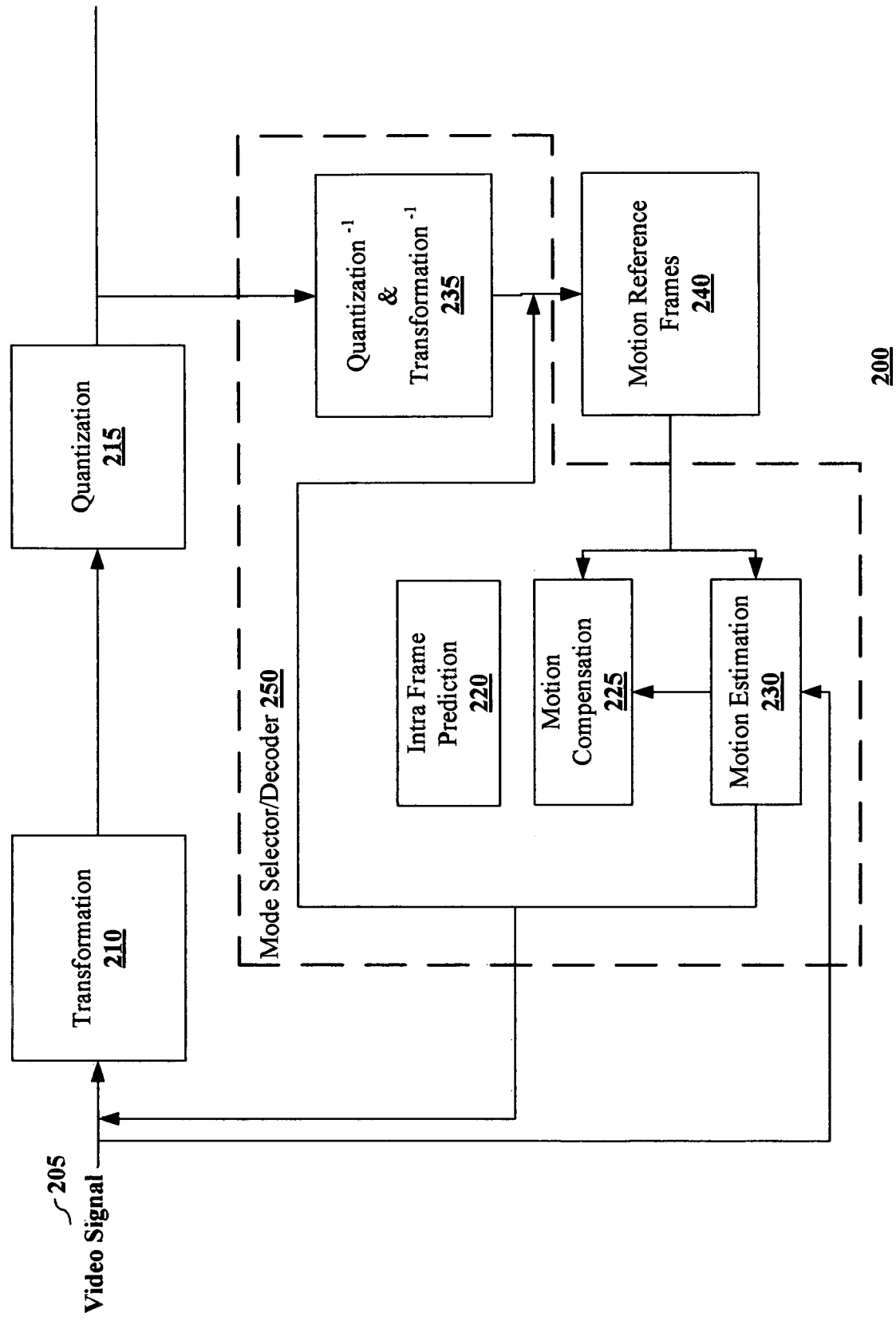
FIG. 2 is a general block diagram of an encoder according to one embodiment of the invention.

FIG. 2 illustrates an encoder 200, including a mode selector 250, according to one embodiment of the invention. A frame within a video signal 205 is transformed by a transformation module 210 using a direct cosine transformation ('DCT') into a set of spatial frequency coefficients; this DCT is analogous to a transformation from a time domain signal into a frequency domain signal. The frequency coefficients are then quantized by a quantization module 215 which applies a scalar to the frequency coefficients. In effect, the quantization process divides the frequency coefficients by an integer scaling factor resulting in a truncated signal. This process of transforming and quantizing the video frame introduces error, such as lost data, into the video signal.

The encoder 200 also includes a mode selector 250 that identifies a mode or modes in which each macroblock in a frame is encoded. This mode selector 250 includes a reverse quantization and transformation module 235, an intra-frame prediction module 220, and a motion compensation module 225. The mode selector 250 may interface with or include a motion estimation module 230 and a memory device that stores multiple motion reference frames 240.

The reverse quantization and transformation module 235 reconstructs a macroblock that had been previously transformed and quantized so that the amount of error introduced into the video signal by the encoding processing may be identified. Reconstruction occurs by reverse quantizing a video signal, which results in a rescaled signal. This rescaled signal is then inversely transformed by an inverse discrete cosine transform to produce a reconstructed frame. This reconstructed frame is compared to the original video frame 205 to identify the error introduced by the encoding process. Each macroblock within the video signal 205 may be encoded in one of multiple different inter or intra prediction modes, each having a particular associated error value.

The intra frame prediction module 220 identifies a potential prediction intra mode for a macroblock. As mentioned above, intra mode encoding uses other blocks within the same video frame to predict a particular block in an intra frame. This identified intra mode is compared to an inter mode to determine whether a macroblock should be encoded using an inter or intra mode. An intra mode may be selected using numerous different methods and devices including those described in the U.S. patent application entitled "Prediction Mode Selection in an Encoder," identified above.

The motion estimation module 230 identifies a reference block and a motion vector representative of a spatial displacement between the reference block and the block that is to be encoded in an inter mode. The reference block may be located within a single video reference frame or may be generated from multiple blocks within a reference frame or multiple reference frames. The motion vector represents movement of the reference block within a two dimensional grid relative to the position of the block that is to be inter encoded.

The motion compensation module 225 predicts a macroblock from other previously decoded blocks in previous frames that may be used in an inter coding process. This prediction is done by identifying an error or distortion level associated with the reference block and motion vector relative to the particular block that is to be inter encoded. This error is encoded and provided to a receiving client so that the particular block may be reconstructed from the reference block and motion vector data. As described above, each inter mode will have an associated error value for the particular block. This error value is a significant component in the rate-distortion performance of each of the modes and may be an important consideration in the selection of a single inter encoding mode for the particular block. An inter mode may be selected using numerous different methods and devices including those described in the U.S. patent application entitled "Motion Estimation and Inter Mode Prediction," identified above.

Once an encoding mode has been selected (either inter or intra mode), the macroblock is encoded accordingly and transmitted onto a communication link. This encoded data is used to reconstruct the macroblock and display it.

C. Exemplary Prediction Inter Modes (H.264 Standard)

Figure 3:
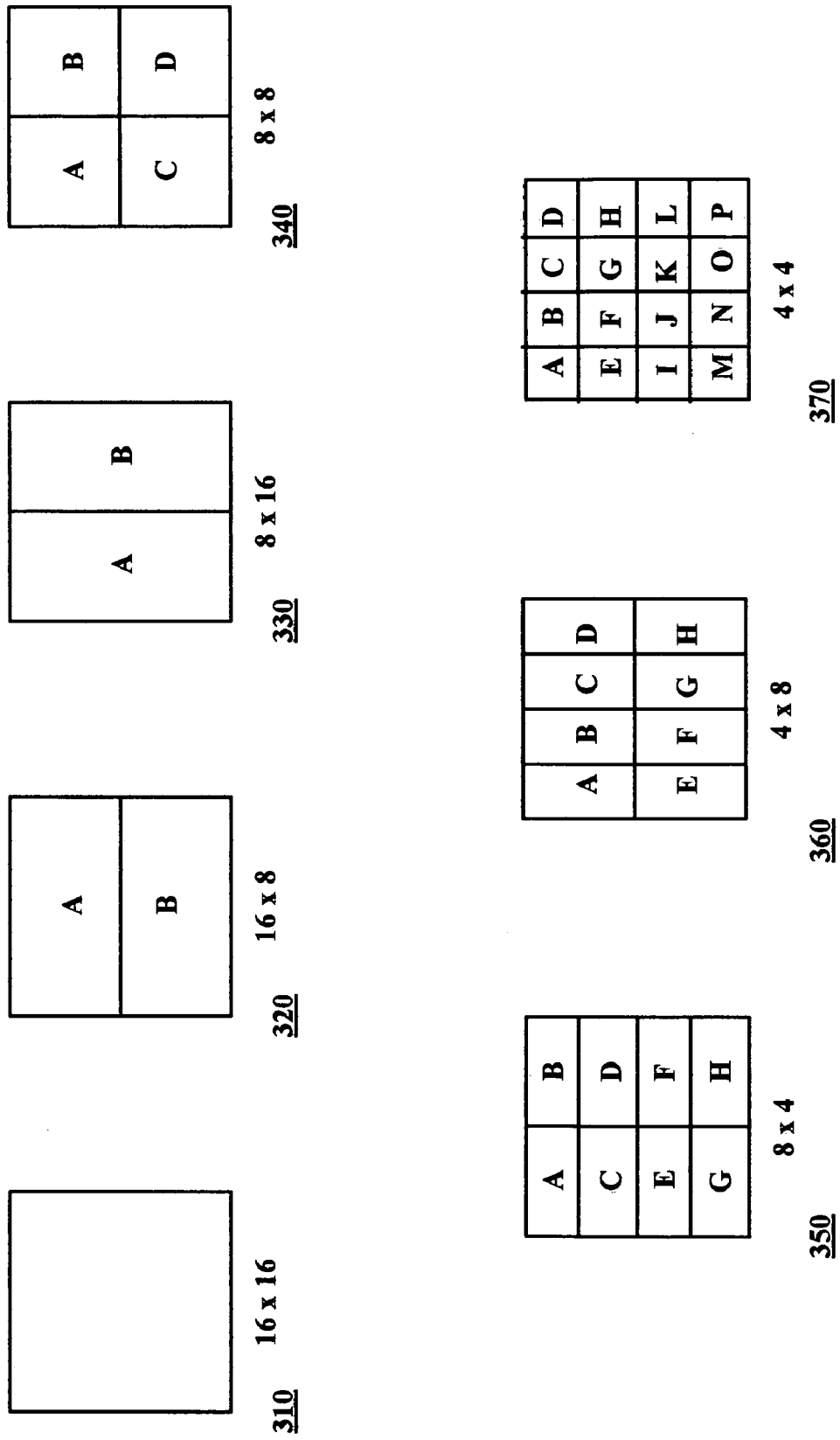
FIG. 3 is a block diagram of modes available for inter-mode encoding according to one embodiment of the invention.

FIG. 3 illustrates exemplary prediction inter modes that may be used in accordance with an embodiment of the invention. These modes are defined by the H.264 specification and include seven different inter modes in which a 16×16 macroblock may be partitioned into sub-blocks. A 16×16 mode 310 does not partition a macroblock, rather the entire macroblock is encoded as a single block. A 16×8 mode 320 horizontally divides the macroblock into two 16×8 blocks with each block being individually encoded. An 8×16 mode 330 vertically divides the macroblock into two 8×16 blocks with each block being individually encoded. An 8×8 mode 340 partitions the macroblock into four 8×8 blocks with each block being individually encoded. An 8×4 mode 350 partitions the macroblock into eight 8×4 blocks with each block being individually encoded. A 4×8 mode 360 partitions the macroblock into eight 4×8 blocks with each block being individually encoded. A 4×4 mode 370 partitions the macroblock into sixteen 4×4 blocks with each block being individually encoded.

Generally, the level of complexity and encoding accuracy increases relative to number of blocks in which a macroblock is partitioned and encoded. Thus, if a macroblock contains a significant amount of distortion (i.e., error relative to a reference block) then a mode with more partitioned blocks, such as a 4×4 mode 370, may be used to more accurately communicate the distortion within the macroblock. However, the amount of processor resources and bandwidth requirements that are need for encoding in a 4×4 mode are relatively large compared to the other modes described above. Thus, if there is very little distortion within a macroblock, then a less demanding mode, such as a 16×16 mode 310, may be used in order to preserve resources for encoding other macroblocks.

D. Macroblock Temporal and Spatial Analysis

Figure 4:
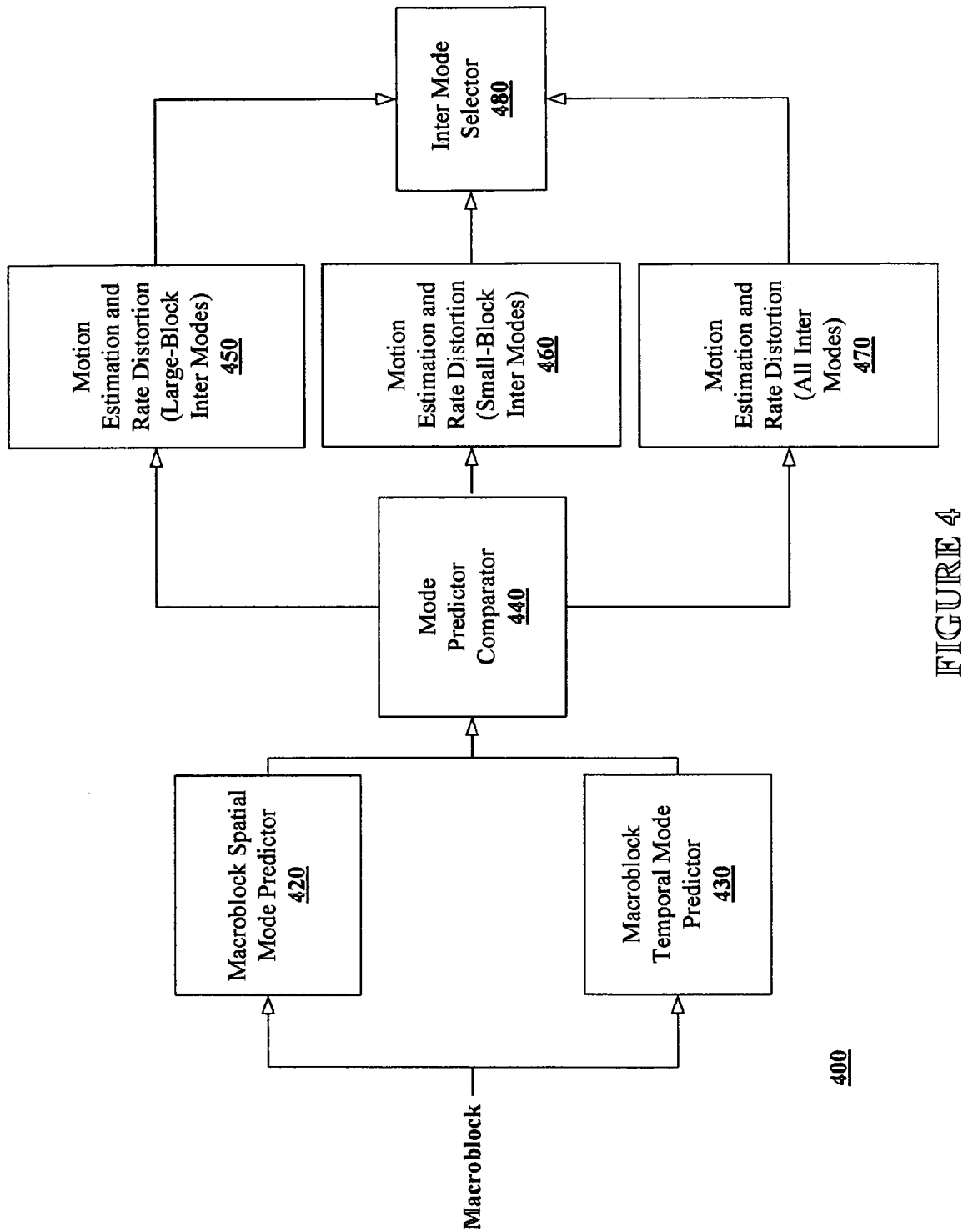
FIG. 4 is a block diagram illustrating a macroblock inter mode selector according to one embodiment of the invention.

FIG. 4 is a block diagram of inter mode selection including both macroblock temporal and spatial analysis according to one embodiment of the invention. Certain characteristics of a macroblock may be analyzed that may suggest the relative complexity required to encode the macroblock. Two of these characteristics are the macroblock temporal and spatial characteristics. Macroblock temporal characteristics describe the consistency of collocated macroblocks across multiple frames. Macroblock spatial characteristics describe the homogeneity of the content within the macroblock.

The present invention analyzes either or both macroblock spatial and temporal characteristics in order to determine whether the number of inter modes, for which motion estimation is to be performed, may be reduced. A significant reduction of inter modes, prior to motion estimation, may greatly reduce the number of computations performed by the encoder in its selection of an encoding mode.

In one embodiment, a macroblock is provided to a macroblock spatial mode predictor 420 and a macroblock temporal mode predictor 430. The macroblock spatial mode predictor 420 analyzes the macroblock homogeneity, which relates to the amount of distortion within the macroblock relative to a (0,0) motion vector. One manner in which the macroblock homogeneity may be quantified is by calculating an RD cost for the macroblock SKIP mode. As mentioned above, the macroblock homogeneity may suggest a level of complexity required to encode the macroblock. Thus, a first subset of inter modes may be identified that correspond to the macroblock homogeneity and inferred encoding complexity requirements. One skilled in the art will recognize that various methods may be performed to analyze macroblock homogeneity.

The macroblock temporal mode predictor 430 analyzes the amount of temporal variance within macroblock relative to other adjacent blocks in previous frames. It is often the case that collocated blocks, across multiple frames, share similar temporal characteristics. In particular, modes at adjacent macroblock locations tend to propagate across multiple frames in many instances. This relationship allows for the analysis of inter modes at adjacent blocks so that a potential inter mode subset for the macroblock may be inferred. Accordingly, in one embodiment of the invention, the macroblock temporal mode predictor 430 analyzes inter modes at adjacent blocks across a previous frame or frames to identify a second subset of inter modes. One skilled in the art will recognize that various methods may be performed to analyze the temporal characteristics of the macroblock and adjacent blocks (including those contiguous to the macroblock).

A mode predictor comparator 440 receives the first subset of inter modes from the macroblock spatial mode predictor 420 and the second subset of inter modes from the macroblock temporal mode predictor 430. The mode predictor comparator 440 analyzes these subsets to determine if an appropriate inter mode subset can be identified from the temporal and spatial analysis of the macroblock.

In one embodiment of the invention, the mode predictor comparator 440 may select an appropriate inter mode subset from a number of defined subsets. For example, a subset relating to higher complexity encoding may be defined as containing 4×4 mode, 4×8 mode, 8×4 mode and 8×8 mode. A subset relating to lower complexity encoding may be defined as containing 16×16 mode, 16×8 mode, 8×16 mode, and 8×8 mode. In another embodiment of the invention, the mode predictor comparator 440 may select an appropriate mode corresponding to the overlap of modes between the first subset and the second subset. Furthermore, the mode predictor comparator 440 may receive other information related to characteristics of the macroblock to aid in the selection of an appropriate inter mode subset. One skilled in the art will recognize that various methods may be used in determining an appropriate inter mode subset based on macroblock temporal and spatial variance characteristics.

If the identified appropriate inter mode subset relates to relatively simpler encoding modes, then a large-block inter modes analyzer 450 analyzes the inter mode subset. In one embodiment, the large-block inter modes analyzer 450 analyzes a 16×16 mode, an 8×16 mode, a 16×8 mode and 8×8 mode. This analysis may include both motion estimation and RD efficiency (e.g., RD cost) computations. Based on the analysis, an inter mode selector 480 selects a preferred inter mode, from the appropriate inter mode subset, in which the macroblock may be encoded.

If the identified appropriate inter mode subset relates to relatively complex encoding modes, then a small-block inter modes analyzer 460 analyzes the inter mode subset. In one embodiment, the small-block inter modes analyzer 460 analyzes a 4×4 mode, an 8×4 mode, a 4×8 mode, and an 8×8 mode. This analysis may include both motion estimation and RD efficiency (e.g., RD cost) computations. Based on the analysis, the inter mode selector 480 selects a preferred inter mode, from the appropriate inter mode subset, in which the macroblock may be encoded.

If the mode predictor comparator 440 is unable to identify an appropriate inter mode subset, then an inter mode analyzer 470 analyzes all potential inter modes. Once again, this analysis may include both motion estimation and RD efficiency (e.g., RD cost) computations. Based on the analysis, the inter mode selector 480 selects a preferred inter mode, from all of the potential inter modes, in which the macroblock may be encoded.

The above-described division of potential inter mode subsets is merely exemplary of one embodiment of the present invention. One skilled in the art will recognize that subsets may be defined in numerous different ways and associated with the macroblock spatial mode predictor 420 and/or the macroblock temporal mode predictor 430 using various different methods, all of which are intended to fall within the scope of the present invention.

a) Macroblock Spatial Mode Predictor

Figure 5:
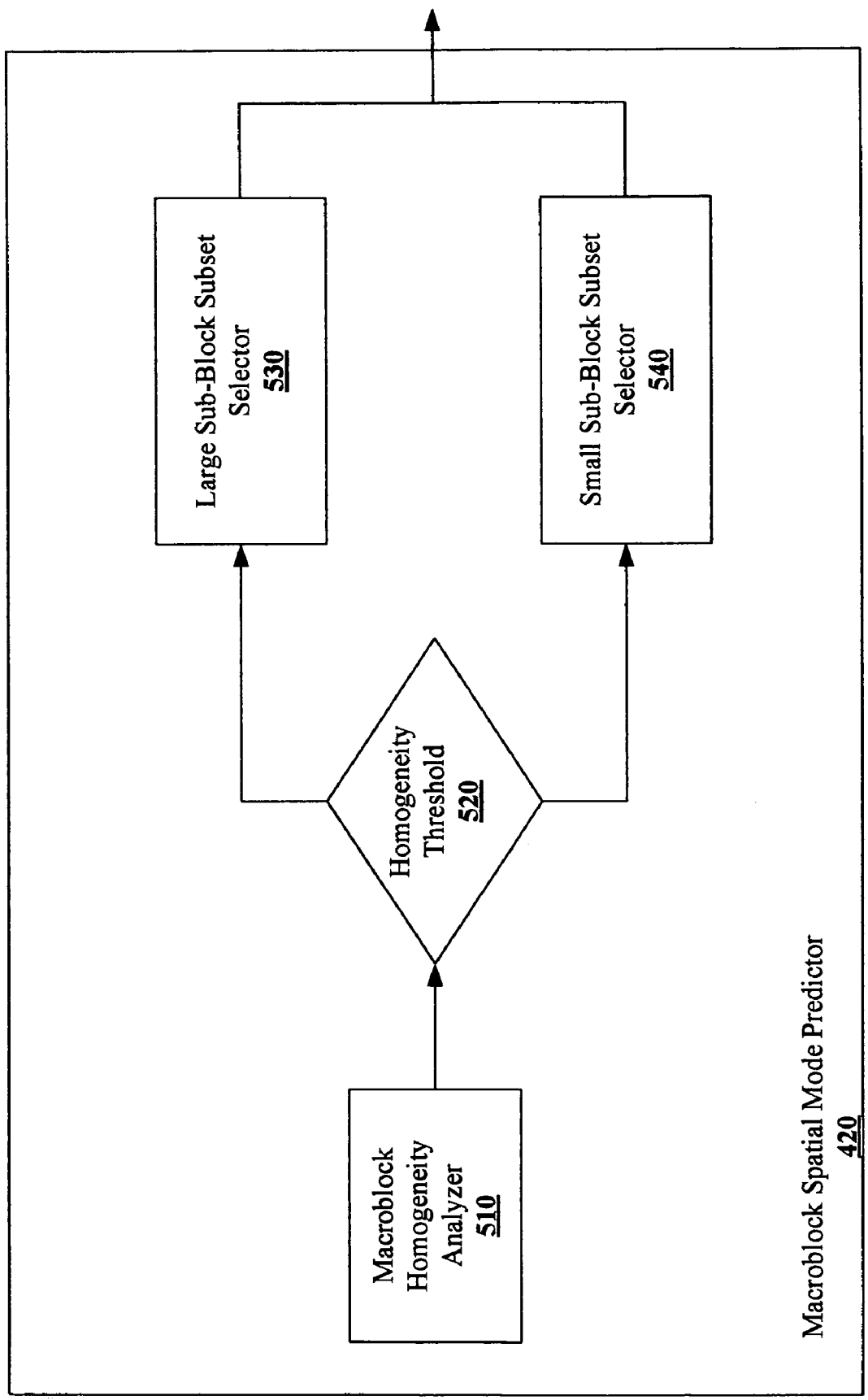
FIG. 5 is a block diagram of a macroblock spatial mode predictor according to one embodiment of the invention.

FIG. 5 is a block diagram illustrating a macroblock spatial mode predictor 420 according to one embodiment of the invention. As described above, the macroblock spatial mode predictor 420 analyzes the macroblock homogeneity in order to identify if the potential number of inter modes may be reduced to a smaller subset of inter modes from which a single mode may be selected.

In one embodiment, a macroblock homogeneity analyzer 510 calculates a RD cost of a SKIP mode associated with the macroblock. This SKIP mode represents the homogeneity level within the macroblock relative to a (0,0) motion vector. The calculated RD cost for the SKIP mode is compared to a homogeneity threshold 520 to determine an appropriate inter mode subset. If the macroblock homogeneity is above the threshold 520, which suggests that a relatively simpler encoding mode is likely to be selected, then a large sub-block subset selector 530 selects an appropriate inter mode subset. In one embodiment, the large sub-block inter mode subset may include a 16×16 mode, a 16×8 mode, an 8×16 mode, and an 8×8 mode.

If the macroblock homogeneity is below the threshold 520, which suggests that a relatively complex encoding mode is likely to be selected, then a small sub-block subset selector 540 selects an appropriate inter mode subset. In one embodiment, the small sub-block inter mode subset may include an 8×8 mode, an 8×4 mode, a 4×8 mode and a 4×4 mode.

The selected inter mode subset (e.g., the large sub-block subset or the small sub-block subset) from the macroblock spatial mode predictor 420 is provided to the mode predictor comparator 440 for further analysis.

b) Macroblock Temporal Mode Predictor

Figure 6:
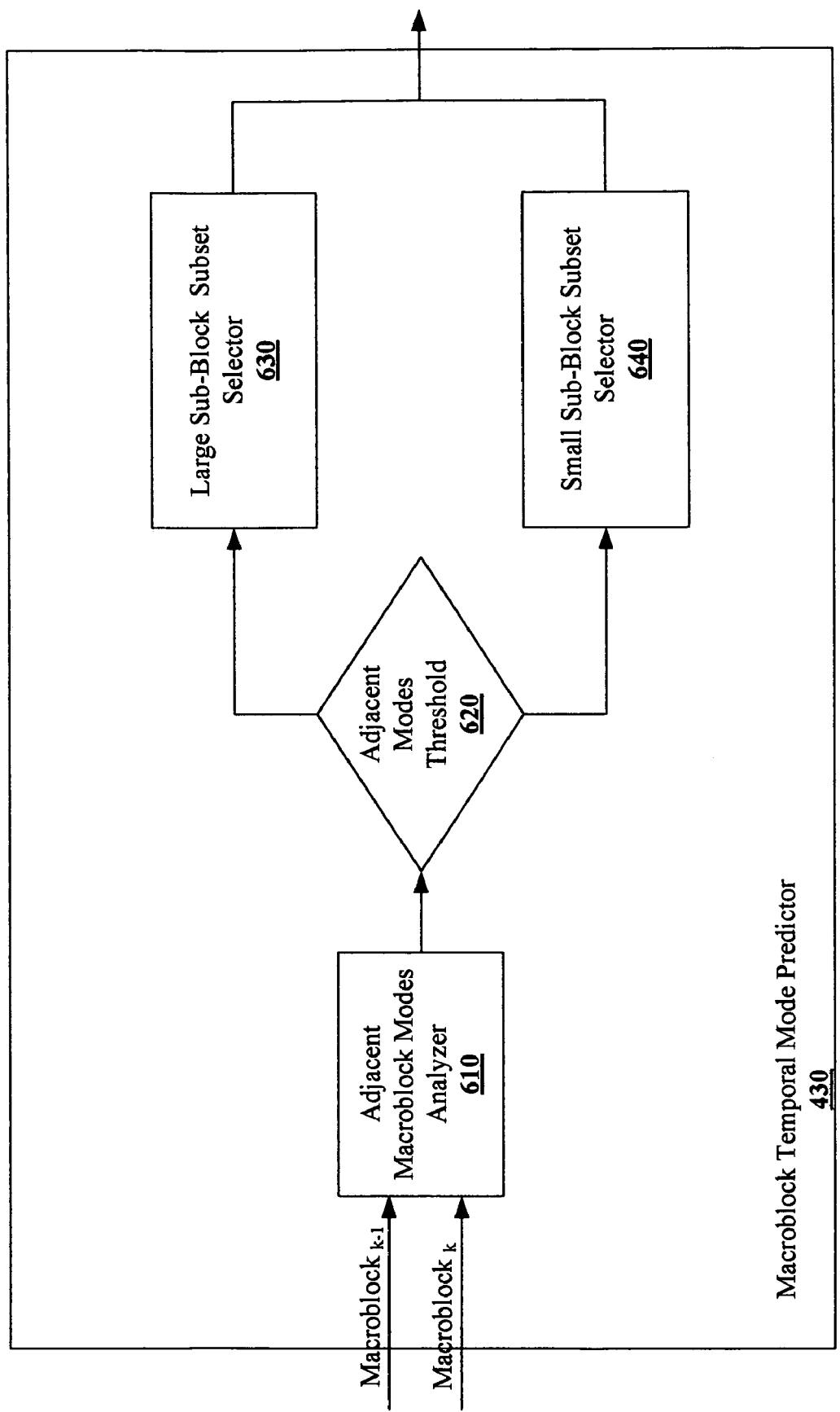
FIG. 6 is a block diagram of a macroblock temporal mode predictor according to one embodiment of the invention.

FIG. 6 is a block diagram of a macroblock temporal mode predictor 430 according to one embodiment of the invention. As described above, the macroblock temporal mode predictor 430 analyzes the temporal distortion around the macroblock in order to identify if the potential number of inter modes may be reduced to a smaller subset of inter modes from which a single mode may be selected.

An adjacent macroblock modes analyzer 610 receives both the macroblock in a current frame (k) and the macroblock in the previous frame (k-1). A plurality of modes for blocks, which are collocated with the macroblock in the current frame (k), are identified and analyzed. Because small modes at collocated blocks tend to propagate across several frames, this relationship between collocated modes may be used to identify inter mode subsets that contain likely candidate inter modes for encoding the macroblock.

Figure 7:
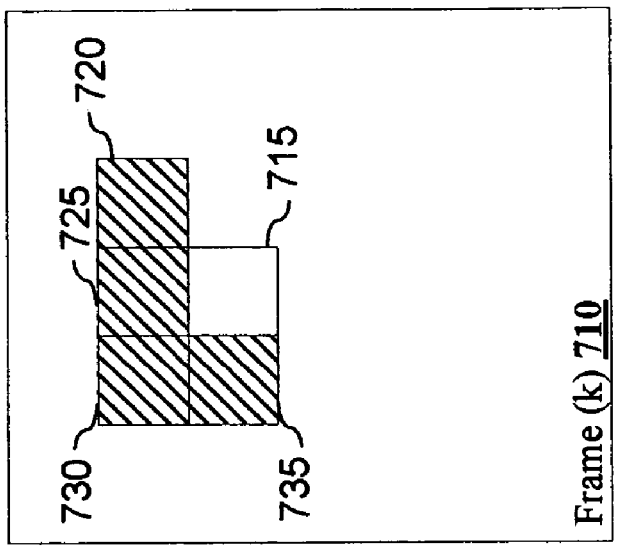
FIG. 7 is an illustration describing macroblock temporal variance according to one embodiment of the invention.
Figure 7:
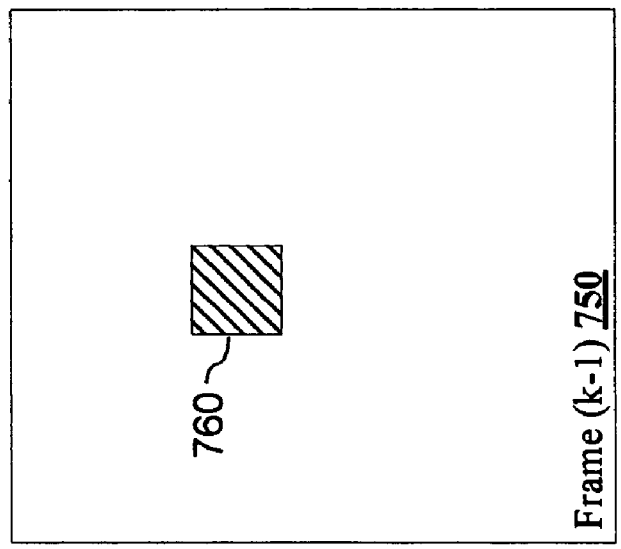

FIG. 7 represents one method in which collocated modes may be analyzed according to one embodiment of the invention. As illustrated, a macroblock 715 within the current fame (k) 710, has four collocated blocks 720-723 for which modes have been identified. Additionally, the macroblock 715 has a corresponding (0,0) motion vector block 760 in the previous frame (k-1) 750 for which a mode has been identified. The collocated macroblock modes analyzer 610 generates an average representation of the modes corresponding to the collocated blocks 720-723 and the block 760 in the previous frame (k-1) 750.

This average value may be generated using various methods. For example, a collocated mode that is either a 4×4 mode, a 4×8 mode, an 8×4 mode or an 8×8 mode is assigned a value X. A collocated mode that is either an 8×16 mode, 16×8 mode, 16×16 mode or a SKIP mode is assigned a value Y. An average value between or equal to X and Y is generated for the four collocated block 720-723 and the block 760 in the previous frame 750. In another example, the five modes may be weighted and summed to create an average value. One skilled in the art will recognize that various methods may be used to represent an average mode value for collocated blocks.

Note that certain collocated blocks are not included in the mode analysis in the above-described embodiment. However, these collocated blocks and other blocks may be included in identifying an average mode value around the macroblock.

Once an average mode value is identified that relates to the temporal variance around the macroblock, the average mode value is compared to a threshold 620 to identify a subset of inter modes. If the macroblock temporal variance suggests that large sub-block modes should be analyzed, then a large sub-block subset selector 630 selects an inter mode subset containing appropriate large sub-block inter modes to be analyzed. For example, this subset of large sub-block modes may include a SKIP mode, a 16×16 mode, an 8×16 mode and a 16×8 mode. If the macroblock temporal variance suggests that small sub-blocks should be analyzed, then a small sub-block subset selector 640 selects an inter mode subset containing appropriate small sub-block inter modes to be analyzed. This subset of small sub-block modes may include a 4×4 mode, a 4×8 mode, an 8×4 mode and an 8×8 mode.

One skilled in the art will recognize that both the large and small sub-block subsets may be defined according to numerous different parameters related to macroblock temporal variance and contain various combination of inter modes.

The selected inter mode subset (e.g., the large sub-block subset or the small sub-block subset) from the macroblock temporal mode predictor 430 is provided to the mode predictor comparator 440 for further analysis.

As described above, the mode predictor comparator 440 compares the subset from the macroblock spatial mode predictor 420 and the subset from the macroblock temporal mode predictor in order to determine whether reducing the number of inter modes, prior to motion estimation calculations for the macroblock, is appropriate. One embodiment of this comparison and selection of subsets is described below.

E. Method of Selecting Inter Mode Subset

Figure 8:
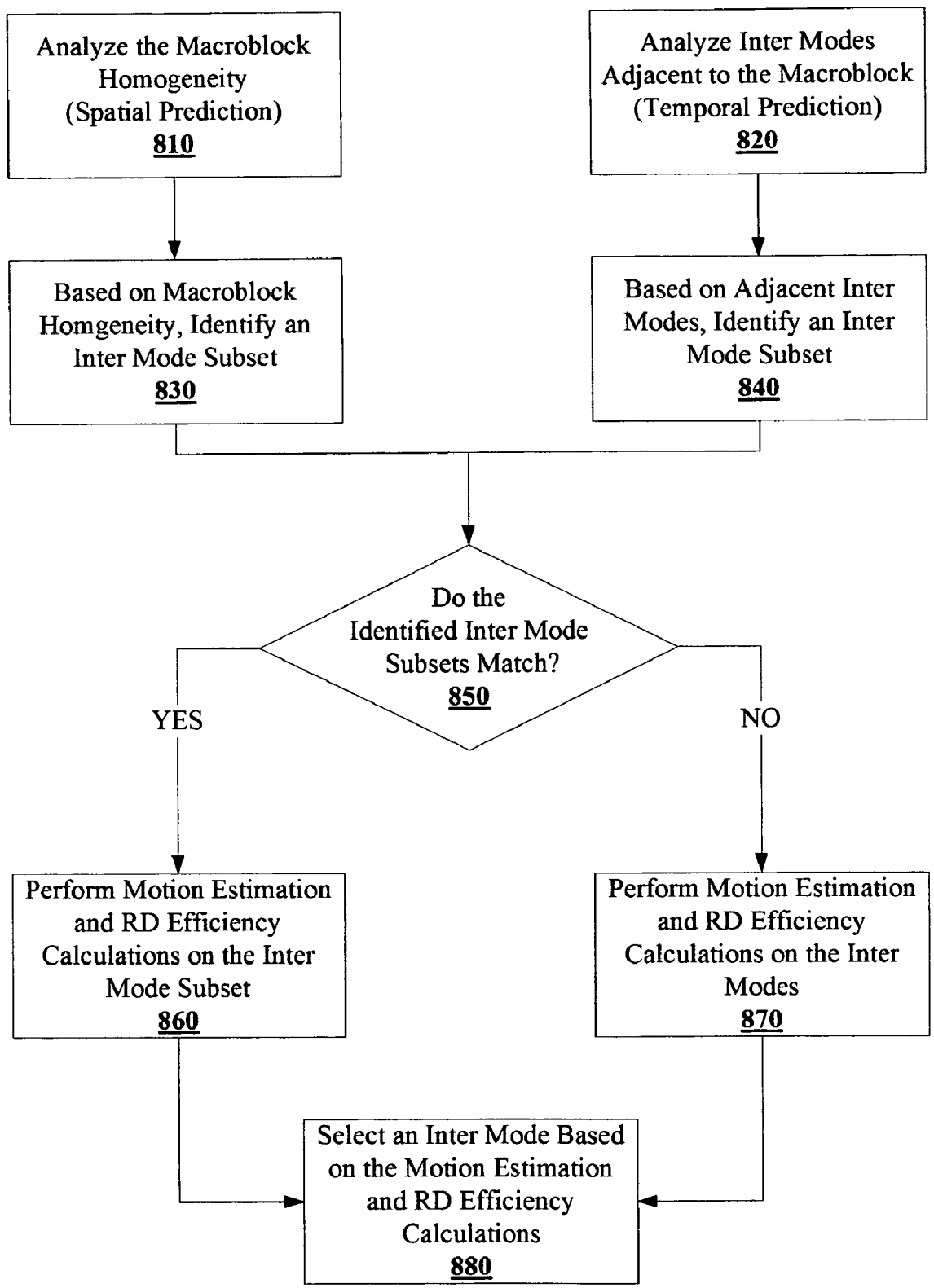
FIG. 8 is a flowchart illustrating a method for reducing the number of prediction inter modes relative to macroblock temporal and spatial distortion according to one embodiment of the invention.

FIG. 8 is a flowchart illustrating a method, independent of structure, for identifying an inter mode subset and selecting an inter mode from the subset according to one embodiment of the invention.

Macroblock homogeneity is analyzed 810 in order to determine whether an appropriate subset of inter modes may be identified that are more likely to correspond to the encoding requirements of the macroblock spatial variance. According to this analysis, a subset of inter modes are identified 830. For example, if the macroblock spatial variance suggests that the macroblock will likely require complex encoding, then a subset is identified containing a majority of small sub-block inter modes. However, if the macroblock spatial variance suggests that the macroblock will likely require relatively simple encoding, then a subset is identified contain a majority of large sub-block inter modes.

Inter modes are analyzed 820 that are identified for blocks collocated to the macroblock so that an appropriate subset of inter modes may be identified that correspond to the temporal variance between the macroblock and its collocated blocks. Based on this analysis, a subset of inter modes are identified 840. For example, if a majority of collocated blocks are encoded using large sub-block inter modes, then a corresponding large sub-block subset is identified. Comparatively, if a majority of collocated blocks are encoded using small sub-block inter modes, then a corresponding small sub-block subset is identified. In addition to the collocated modes described above, modes in previous frames may also be included in the analysis. In particular, the mode corresponding to a block at (0,0) motion vector in the previous frame may also be used in this temporal variance analysis.

The subsets identified from the temporal and spatial variance of the macroblock are compared to identify if an appropriate reduction of potential inter modes to a subset of inter modes is appropriate. In one embodiment, the subsets are compared 850 to identify if they match. If there is a match between the two subsets, then motion estimation and RD efficiency calculations are performed 860 on the inter modes within the matched subset. If there is not a match, then motion estimation and RD efficiency calculations are performed 870 on all of the potential inter modes.

Based on the motion estimation and RD efficiency calculations an inter mode is selected 880 from either the subset of inter modes or all of the potential inter modes.

F. Macroblock Internal Analysis of Mean and Variance Characteristics

Figure 9:
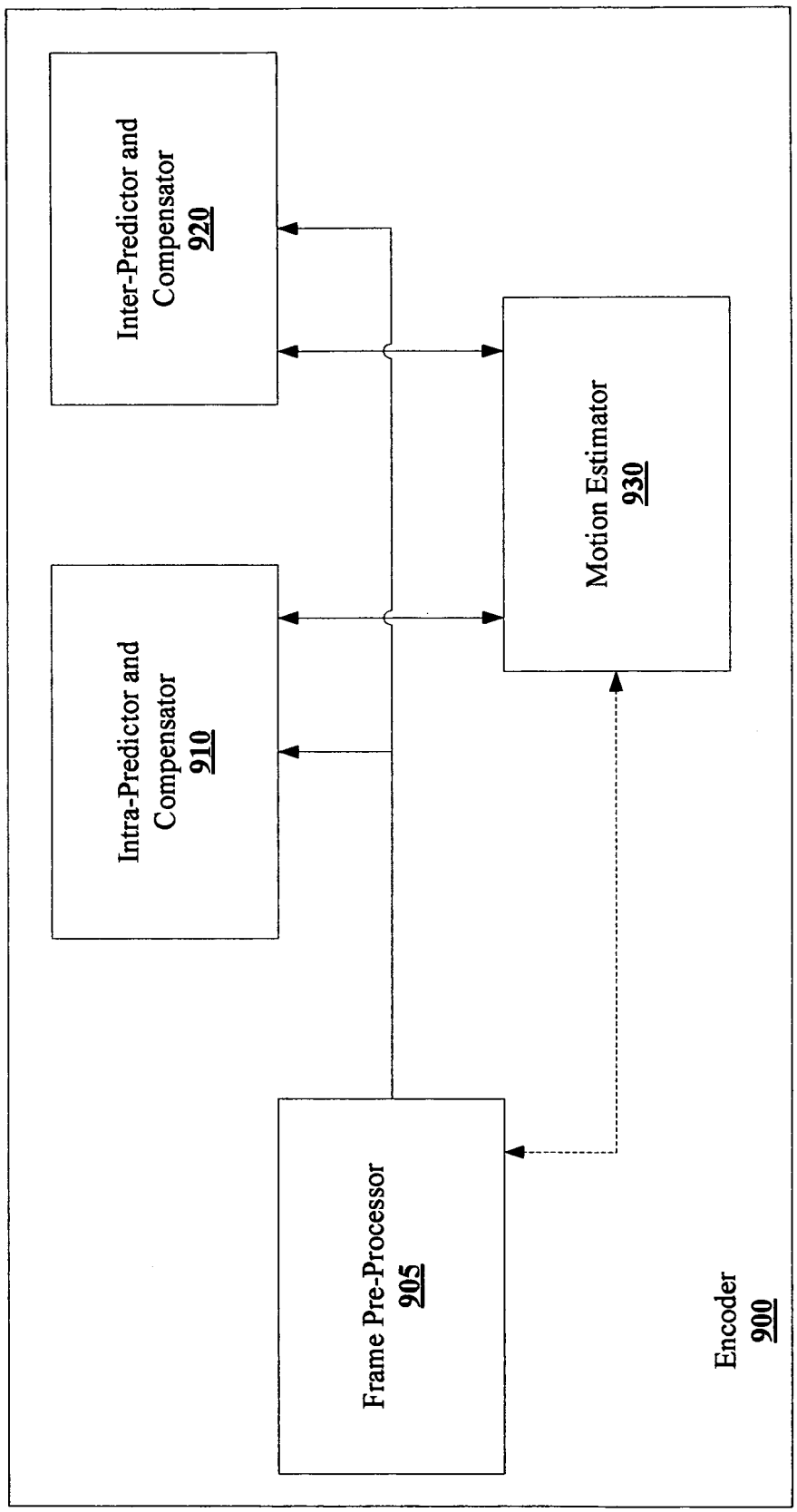
FIG. 9 is an illustration of an encoder having a frame pre-processor according to one embodiment of the invention.

FIG. 9 illustrates a mode predictor having a frame pre-processor according to one embodiment of the invention. The mode predictor 900 has an intra-predictor and compensator 910, inter predictor and compensator 920, and a motion estimator 930 that analyze inter and intra modes and select an appropriate prediction mode for a macroblock. The mode predictor 900 also has frame pre-processor 905 that analyzes and potentially segments the macroblock into sub-blocks to aid in the selection of a prediction mode for the macroblock. Additionally, the frame pre-processor 905 may also control processes within the motion estimator 930 by identifying stationary and moving regions of the picture as well as being able to perform some sort of noise cleaning of the video source prior to it being encoded.

In one embodiment of the invention, the pre-processor 905 segments a macroblock into sub-blocks and merges these sub-blocks according to pixel mean and variance values. In this embodiment, each macroblock is partitioned into nonoverlapping 4×4 sub-blocks, for which mean (m) and variance ($\sigma^2$) calculations are performed. Based on these calculations, 4×4 sub-blocks may be merged to form larger sub-blocks within the macroblock.

Figure 10:
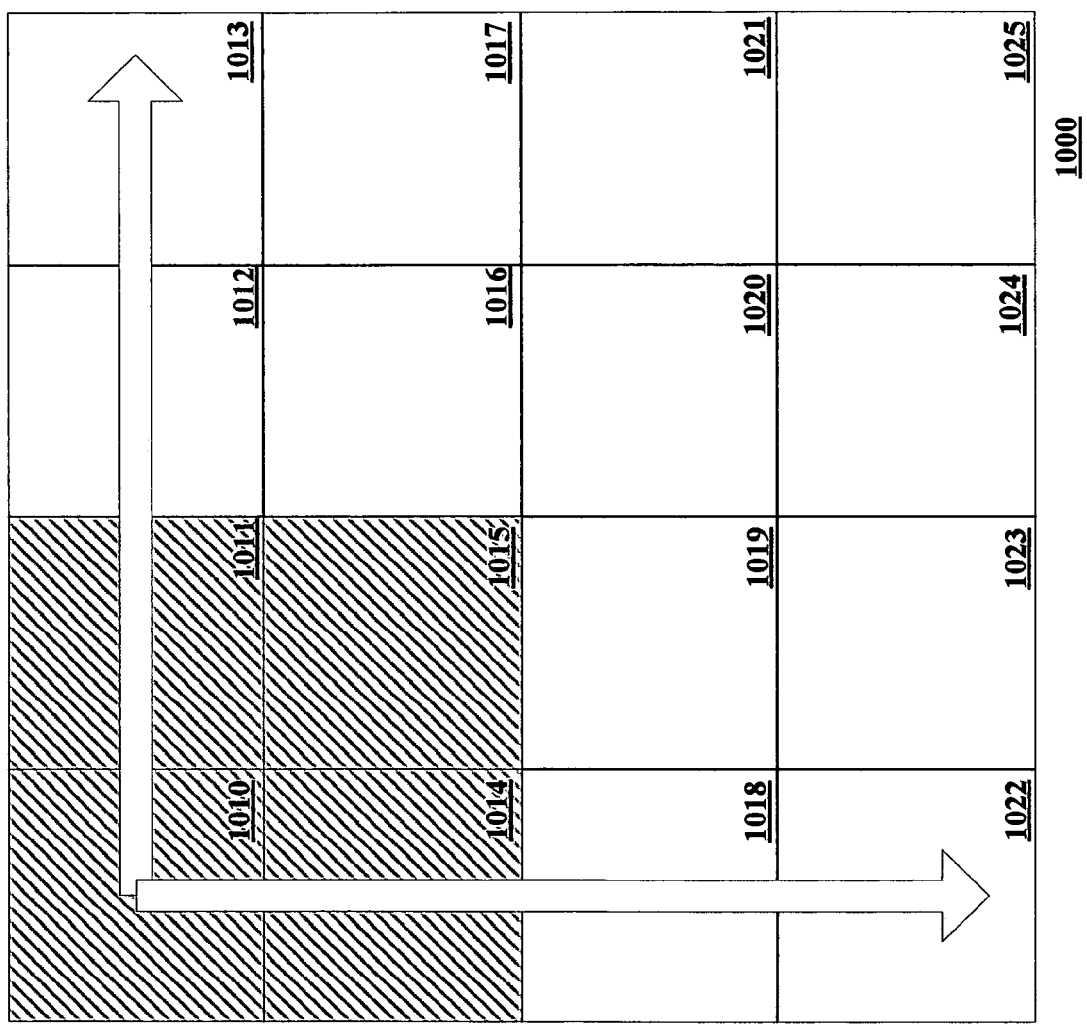
FIG. 10 is an illustration describing macroblock sub-block mean and variance analysis to group sub-block according to one embodiment of the invention.

FIG. 10 illustrates an example of this initial macroblock 4×4 sub-block partition and subsequent merger. A macroblock 1000 is partitioned into sixteen 4×4 sub-blocks 1010-1025. Mean and variance calculations are performed and compared on both rows and columns to identify 4×4 collocated sub-blocks with similar mean and variance values. In this particular instance, the mean and variance values for four collocated sub-blocks 1010, 1011, 1014, 1015 are sufficiently similar to merge them into a single 8×8 sub-block.

In one embodiment of the invention, 4×4 luma blocks are merged if the following criteria is met:

if $|m_1-m_2| \leq T_1$ and $|\sigma_1^2-\sigma_2^2| \leq T_2$; where $T_1$ and $T_2$ are thresholds relating to mean and variance values.

The resulting merger of 4×4 sub-blocks may produce a variety of different sub-blocks within the macroblock including 4×8 blocks, 8×4 blocks, 8×8 blocks, 8×16 blocks, 16×8 blocks or a 16×16 block.

a) 16×16 Luma Encoding

If the macroblock segmentation and sub-block merger suggests that the macroblock should be segmented as a 16×16 block then the 4×4 sub-blocks need not be considered for luma encoding. The frame pre-processor 910 may identify which 16×16 mode is preferred for the macroblock by performing another similarity test in which sub-blocks on the edge of the macroblock are compared to edge blocks in collocated blocks to the macroblock.

Referring to FIG. 11, a macroblock 1100 has four 4×4 sub-blocks 1120, 1124-1126 that border its left edge and are contiguous to block 1130 that is immediately left of the macroblock 1100. A similarity test between the four 4×4 sub-blocks 1120, 1124-1126 and contiguous blocks $L_1$-$L_4$, within block 1130, is performed and a vertical similarity between the contiguous blocks may be identified. A similarity test between the four 4×4 sub-blocks 1120-1123 and contiguous blocks $T_1$-$T_4$, within block 1140, is performed and a horizontal similarity between the contiguous blocks may also be identified.

The vertical and horizontal similarities between the macroblock 1100 and collocated blocks 1130, 1140 may be analyzed to identify an appropriate luma encoding mode. For example, the following criteria are examples in which this identification may occur:

(1) If the vertical and horizontal similarity values are equal then select mode 3;

(2) If the horizontal similarity value is larger than the vertical similarity value, then select mode 0; and (3) If the horizontal similarity value is less than the vertical similarity value, then select mode 1.

Mode 2 may be used as a default selection and may be selected in place of modes 0, 1, or 3 if prediction errors in mode 2 are less than the selected mode above.

b) 4×4 Luma Encoding

If the macroblock segmentation and sub-block merger suggests that the macroblock should be segmented as 4×4 sub-blocks then the 16×16 blocks need not be considered for luma encoding. There are nine prediction modes for each 4×4 sub-block.

In one embodiment of the invention, each 4×4 sub-block is compared to the 4×4 sub-block contiguous on its left and the 4×4 sub-block contiguous above it. Based on this comparison, a smaller subset of prediction modes, from the potential nine modes, is identified.

One example in which this comparison may be performed is as follows:

For each 4×4 sub-block, if it is sufficiently similar to the block above it then define $S_{TOP}=1$, else $S_{TOP}=0$;

Likewise, if the 4×4 sub-block is sufficiently similar to the contiguous block to its left then define $S_{LEFT}=1$, else $S_{LEFT}=0$.

The number of potential prediction modes may then be reduced according to the following criteria:

If $S_{TOP}=1$ and $S_{LEFT}=0$, select mode 2;
If $S_{TOP}=1$ and $S_{LEFT}=0$, select modes 0, 3, and 7;
If $S_{TOP}=0$ and $S_{LEFT}=1$, select modes 1 and 8;
If $S_{TOP}=1$ and $S_{LEFT}=1$, select modes 4, 5, and 6.

The subset of prediction modes may then be further analyzed and a single mode selected from the subset.

c) Inter Mode Selection

In the case of inter mode selection, the initial segmentation and 4×4 sub-block merger directly provides the appropriate segmentation and eliminates the other modes. Thus, if the segmentation suggests a particular sub-block for inter mode encoding, then an RD computation may be performed on the corresponding mode and subsequent analysis performed. For example, if the RD cost associated with one mode for a 4×4 sub-block is N, then the worst case RD cost for the 16×16 macroblock is 64N since the worst case segmentation occurs when the 16×16 macroblock is segmented into four 8×8 sub-blocks and each 8×8 sub-block may be treated as an 8×8 block, two 8×4 blocks, two 4×8 blocks or four 4×4 blocks.

While the present invention has been described with reference to certain exemplary embodiments, those skilled in the art will recognize that various modifications may be provided. Accordingly, the scope of the invention is to be limited only by the following claims.

We claim:

1. A method of selecting an inter mode for encoding a video macroblock, the method comprising:

analyzing spatial variance of a macroblock using a macroblock spatial mode predictor;

identifying a first subset of inter modes based on the macroblock spatial variance;

analyzing temporal variance around the macroblock using a macroblock temporal mode predictor;

identifying a second subset of inter modes based on the temporal variance around the macroblock;

defining a third subset of inter modes according to a relationship between the first and second subsets; and selecting an inter mode, from the third subset of inter modes, in which the macroblock will be encoded;

wherein the analyzing temporal variance comprises:

identifying a plurality of modes in which at least two blocks, collocated to the macroblock, are to be encoded;

averaging the plurality of modes;

comparing the average of the plurality of modes to a threshold; and wherein the second subset is identified based on the comparison of the average of the plurality of modes to the threshold.

2. The method of claim 1, wherein analyzing the spatial variance comprises:

calculating a rate distortion cost for a SKIP mode associated with the macroblock;

comparing the SKIP mode rate distortion cost to a threshold; and wherein the first subset is identified based on the comparison of the SKIP mode rate distortion cost to the threshold.

3. The method of claim 2, wherein the first subset comprises a 16×16 mode, a 16×8 mode, an 8×16 mode, and an 8×8 mode, if the SKIP mode rate distortion cost is below the threshold.

4. The method of claim 2, wherein the first subset comprises an 8×8 mode, an 8×4 mode, a 4×8 mode, and a 4×4 mode, if the SKIP mode rate distortion cost is above the threshold.

5. The method of claim 1, wherein the second subset comprises a 16×16 mode, 8×16 mode, 16×8 mode, and 8×8 mode, if the comparison suggests a large-block mode.

6. The method of claim 1, wherein the second subset comprises an 8×8 mode, an 8×4 mode, a 4×8 mode and a 4×4 mode, if the comparison suggests a small-block mode.

7. The method of claim 1, wherein the third subset of inter modes is defined by identifying an overlap of the first subset of inter modes to the second subset of inter modes.

8. The method of claim 7, wherein the third subset of inter modes comprises modes common to both the first subset of inter modes and the second subset of inter modes.

9. A computer readable medium storing instructions for performing the method of claim 1.

10. An encoder for encoding a video macroblock, comprising:
a macroblock temporal mode predictor, coupled to receive a macroblock, that analyzes temporal variance around the macroblock and defines a first subset of inter modes based on the analysis, the temporal variance analysis comprising identifying a plurality of modes in which at least two blocks, collocated to the macroblock, are to be encoded, averaging the plurality of modes, and comparing the average of the plurality of modes to a threshold;
a macroblock spatial mode predictor, coupled to receive the macroblock, that analyzes spatial variance within the macroblock and defines a second subset of inter modes based on the analysis;
a mode predictor, coupled to receive the first and second subsets of inter modes, that defines a third subset of inter modes based on an analysis of the first and second subsets of inter modes; and
an inter mode selector, coupled to receive the third subset of inter modes, that selects an inter mode to encode the macroblock from the third subset of inter modes;
wherein the second subset is identified based on the comparison of the average of the plurality of modes to the threshold.

11. The encoder of claim 10, wherein the spatial mode predictor performs a SKIP mode rate distortion cost computation for the macroblock to analyze spatial variance.

12. The encoder of claim 10, wherein the temporal mode predictor identifies a plurality of mode in which at least two blocks, collocated to the macroblock, are to be encoded to analyze temporal variance.

13. The encoder of claim 10, wherein the third subset of inter modes is defined by identifying common modes in the first and the second subsets of inter modes.

* * * * *